United States Patent [19]

Sashida et al.

[11] Patent Number: 5,274,538
[45] Date of Patent: * Dec. 28, 1993

[54] POWER CONVERSION APPARATUS

[75] Inventors: Nobuo Sashida; Kazunori Sanada, both of Kobe, Japan

[73] Assignee: Mitsubishi Denki Kabushiki Kaisha, Tokyo, Japan

[*] Notice: The portion of the term of this patent subsequent to Oct. 27, 2009 has been disclaimed.

[21] Appl. No.: 775,607

[22] Filed: Oct. 15, 1991

[30] Foreign Application Priority Data

Oct. 16, 1990 [JP] Japan ................................. 2-279895

[51] Int. Cl.$^5$ ............................................. H02M 5/22
[52] U.S. Cl. ............................................ 363/8; 363/10; 363/159
[58] Field of Search ............... 363/8, 10, 159, 160, 363/161, 163, 39, 79, 55-58, 162, 164-165, 41

[56] References Cited

U.S. PATENT DOCUMENTS

| | | | |
|---|---|---|---|
| 3,487,289 | 12/1989 | McMurray | 321/45 |
| 3,742,336 | 6/1973 | Bedford | 321/69 R |
| 4,479,175 | 10/1984 | Gille et al. | 363/41 |
| 4,556,937 | 12/1985 | Ziogas et al. | 363/8 |
| 4,639,850 | 1/1987 | Asaeda et al. | 363/58 |
| 4,652,770 | 3/1987 | Kumano | 307/66 |
| 4,677,537 | 6/1987 | Chonan | 363/126 |
| 4,706,178 | 11/1987 | Hayashi | 363/98 |
| 4,719,550 | 1/1988 | Powell et al. | 363/37 |
| 4,847,744 | 7/1989 | Araki | 363/49 |
| 4,855,887 | 8/1989 | Yamato et al. | 363/8 |
| 4,878,163 | 10/1989 | Yamato et al. | 363/8 |
| 4,969,080 | 11/1990 | Kawabata et al. | 363/41 |
| 5,159,539 | 10/1992 | Koyama | 363/8 |

FOREIGN PATENT DOCUMENTS 0293170 12/1986 Japan .

OTHER PUBLICATIONS

"High Frequency Link DC/AC Converter with PWM Cycloconver"; IEEE Catalog No. 90CH2935-5; Conference Record of the 1990 IEEE Industry Applications Society Annual Meeting; pp. 1119-1124.

"High Frequency Link DC-AC Converter for UPS with a New Voltage Clamper"; 21st Annual IEEE Power Electronics Specialists Conference; pp. 749-756; 1990.

Primary Examiner—Steven L. Stephan
Assistant Examiner—Adolf Berhane
Attorney, Agent, or Firm—Leydig, Voit & Mayer

[57] ABSTRACT

A power conversion apparatus comprises an inverter circuit for converting DC power into AC power which has a first frequency; a transformer connected to the inverter circuit. A cyclo converter circuit having a bidirectional switch controls a direction in which an electric current passes and converts the output from the transformer into AC power which has a second frequency. A switching signal generating circuit generates a switching signal for controlling the polarity of the bidirectional switch of the cyclo converter circuit in such a manner that the output voltage from the inverter circuit does not encounter a short circuit.

7 Claims, 11 Drawing Sheets

POWER CONVERSION APPARATUS

BACKGROUND OF THE INVENTION

1. Field of the Invention:

The present invention relates to a power conversion apparatus for use in an AC power source apparatus such as an uninterruptive power supply apparatus (hereinafter abbreviated to a "UPS") or a fuel cell generating system.

2. Description of the Related Art:

FIG. 8 is a block diagram which illustrates a power conversion apparatus disclosed in, for example, Japanese Patent Application No. 1-211737. Referring to FIG. 8, reference numeral 1 represents a DC power source, 2 represents an inverter circuit and 3 represents a transformer the input terminal of which is connected to the inverter circuit 2. Reference numeral 4 represents a cyclo converter circuit connected to the output terminal of the transformer 3. Reference numeral 5 represents a filter circuit connected to the output terminal of the cyclo converter circuit 4. Reference numeral 6 represents a load circuit, 10 represents a carrier signal generating circuit, 11 represents an inverter switching circuit, 12 represents a reference voltage signal generating circuit and 13b represents a switching signal generating circuit.

FIG. 9 illustrates the detailed structures of the inverter circuit 2, the transformer 3, the cyclo converter circuit 4 and the filter circuit 5. The inverter circuit 2 comprises switching devices $S_1$ to $S_4$ composed of transistors, MOSFETs or the like and diodes $D_1$ to $D_4$ which are connected respectively, in an anti-parallel manner, connected to the corresponding switching devices $S_1$ to $S_4$. The transformer 3 has a primary coil which is connected to the inverter circuit 2 and as well has a secondary coil which is connected to the cyclo converter circuit 4. The cyclo converter circuit 4 comprises switching devices $S_5$ to $S_8$ and $S_{5A}$ to $S_{8A}$ composed of transistors, MOSFETs or the like and diodes $D_5$ to $D_8$ and $D_{5A}$ to $D_{8A}$ which are connected respectively, in an anti-parallel manner, to the corresponding switching devices $S_5$ to $S_8$ and $S_{5A}$ to $S_{8A}$. The two semiconductor switching devices $S_n$ and $S_{nA}$ (n=5 to 8) and two diodes $D_n$ and $D_{nA}$ (n=5 to 8) connected to the switching device in an anti-parallel manner constitute a bidirectional switch $Q_n$ which is capable of controlling the power supply direction.

As shown in FIG. 10, the inverter switching circuit 11 comprises a ½ divider 100 which transmits an output signal, the polarity of which is inverted in synchronization with the last transition of an input signal, and a NOT circuit 101 connected to the ½ divider 100. The inverter switching circuit 11 transmits switching signals $T_1$ to $T_4$ to the inverter circuit 2, the signals $T_1$ to $T_4$ being signals for switching on/off the switching devices $S_1$ to $S_4$ of the inverter circuit 2.

FIG. 11 illustrates the detailed structure of the switching signal generating circuit 13b which comprises an absolute value circuit 102, a comparator 103, NOT circuits 105, 106, 108 and 110, ½ dividing circuits 104 and 107, a polarity discriminating circuit 109, AND circuits 111 to 118 and OR circuits 119 to 122. The switching signal generating circuit 13b transmits signals $T_5$ to $T_8$ which are signals for switching on/off switches $Q_5$ to $Q_8$ of the cyclo converter circuit 4.

Then, the operation of the above-described conventional apparatus will now be described with reference to a timing chart shown in FIG. 12. First, a sawtooth shape carrier signal Vp facing an upper right direction is transmitted from the carrier signal generating circuit 10. Then, switching signals $T_1$ to $T_4$, the duty ratio of each of which is 50%, are transmitted from the inverter switching circuit 11 shown in FIG. 10. That is, when the carrier signal Vp is supplied, signal Tx, which synchronizes with the signal Vp and which is halved, is transmitted from the ½ divider 100. Furthermore, the NOT circuit 101 transmits signal Ty which is a signal obtainable by inverting the sign of the signal Tx. As a result, the signal Tx is, as the switching signals $T_1$ and $T_4$, transmitted to the inverter circuit 2. Furthermore, the signal Ty is, as the switching signals $T_2$ and $T_3$, transmitted to the same. When the level of each of the switching signals $T_1$ to $T_4$ is high, the corresponding switching devices $S_1$ to $S_4$ of the inverter circuit 2 are switched on, while the same are switched off when the above-described level is low. Furthermore, the relationship between the switching on/off operations of the switching devices $S_1$ to $S_4$ and the secondary voltage $V_2$ of the transformer 3 shown in FIG. 9 can be expressed as follows:

When the switches $S_1$ and $S_4$ are switched on:
$V_2 = V_{dc}$

When the switches $S_2$ and $S_3$ are switched on:
$V_2 = -V_{dc}$ (A)

where symbol $V_{dc}$ denotes the output voltage from the DC power source 1.

Therefore, the secondary voltage $V_2$ becomes a rectangular wave voltage the duty ratio of which is 50% as shown in FIG. 12.

On the other hand, the reference voltage signal generating circuit 12 transmits reference voltage signal $V_{cc}^*$ serving as a reference of the voltage to be transmitted from the cyclo converter 4, the reference voltage signal $V_{cc}^*$ being, together with the carrier signal Vp, supplied to the switching signal generating circuit 13b. The switching signal generating circuit 13b receives the above-described signals so as to transmit the switching signals $T_5$ to $T_8$ the pulse width of each of which has been modulated as follows. Referring to FIG. 11, the reference voltage signal $V_{cc}^*$ is converted into absolute signal $|V_{cc}^*|$ by the absolute value circuit 102. The absolute signal $|V_{cc}^*|$ is, together with the carrier signal Vp, supplied to the comparator 103. The comparator 103 transmits signal Tp shown in FIG. 12, the signal Tp being then supplied to the ½ divider 104 in which the signal Tp is converted into signal Ta. On the other hand, when the signal Tp is supplied to the ½ divider 107 after the sign of it has been inverted by the NOT circuit 106, signal Tb formed into the same wave shape as that of the signal Tx is transmitted. Furthermore, when the signal Ta is supplied to the NOT circuit 105, signal Tc is transmitted, while when the signal Tb is supplied to the NOT circuit 108, signal Td formed into the same wave shape as that of the signal Ty is transmitted.

Then, the relationship between the signals Ta to Td and output voltage Vcc from the cyclo converter circuit 4 will now be described. In a case where there is a desire to make the polarity of the output voltage Vcc positive, the switching signals $T_5$ to $T_8$ are determined in accordance with the following equations:

$$T_5=T_a, T_6=T_c, T_7=T_d, T_8=T_b \tag{B}$$

In response to the above-described switching signals $T_5$ to $T_8$, the switch $Q_n$ (n=5 to 8) which constitutes the bidirectional switch is switched on/off. As a result, the output voltage Vcc from the cyclo converter circuit 4 is controlled. The fact that the switch $Q_n$ is switched on/off means that the switching devices Sn and SnA are simultaneously switched on/off. The relationship between the switching on/off operation performed by the switch $Q_n$ (n=5 to 8) and the above-described output voltage Vcc is expressed by the following equations:

$$\left.\begin{array}{l}\text{When switches } Q_5 \text{ and } Q_8 \text{ are switched on: } Vcc = V_2 \\ \text{When switches } Q_6 \text{ and } Q_7 \text{ are switched on: } Vcc = -V_2 \\ \text{When switches } Q_5 \text{ and } Q_7 \text{ are switched on: } Vcc = 0 \\ \text{When switches } Q_6 \text{ and } Q_8 \text{ are switched on: } Vcc = 0\end{array}\right\} \tag{C}$$

Therefore, the following facts can be deduced from Equations (B) and (C): when the levels of each of the signals Ta and Tb is high, the relationship $Vcc=V_2$ is held, when the levels of each of the signals Tc and Td is high, the relationship $Vcc=-V_2$ is held. When the levels of each of the signals Ta and Td or the signals Tb and Tc are high, the relationship $Vcc=0$ is held. Therefore, the output voltage Vcc from the cyclo converter circuit 4 is, as shown in FIG. 12, becomes positive voltage the pulse width of which has been modulated. In a case where there is a desire to make the polarity of the output voltage Vcc to be negative, the switching signals $T_5$ to $T_8$ may be determined in accordance with the following equations:

$$T_5=T_c, T_6=T_a, T_7=T_b, T_8=T_d \tag{D}$$

Then, the description about the operation shown in FIG. 11 will now be continued. The polarity discriminating circuit 109 transmits polarity signal Vsgn denoting the polarity of the reference voltage signal Vcc*. The NOT circuit 110 transmits a signal which is a signal obtainable by inverting the sign of the polarity signal Vsgn. The above-described signals and the signals Ta to Td are, via the AND circuits 111 to 118, supplied to the OR circuits 119 to 122. When the polarity of the reference voltage signal Vcc* is positive, the signals Ta, Tc, Td and Tb are transmitted from the AND circuits 111, 114, 116 and 117, respectively. Therefore, the switching signals $T_5$ to $T_8$ in accordance with Equation (B) are transmitted to the switches $Q_5$ to $Q_8$ of the cyclo converter circuit 4. Similarly, when the polarity of the reference voltage Vcc* is negative, the switching signals $T_5$ to $T_8$ in accordance with Equation (D) are transmitted to the switches $Q_5$ to $Q_8$. As a result of the above-described operations, the voltage Vcc, the wave form of which is obtainable by modulating the pulse width of the AC reference voltage signal Vcc* transmitted from the reference voltage signal generating circuit 12, is transmitted from the cyclo converter circuit 4. Furthermore, by supplying the above-described output voltage to the filter circuit 5 composed of a reactor $L_F$ and a capacitor $C_F$ as shown in FIG. 9, sine wave voltage from which the high frequency component has been removed by the pulse width modulation is supplied to the load circuit 6.

Since the conventional power conversion apparatus has been constituted as described above, there arises a problem in that undesirable surge voltage can be generated by energy stored in the circuit inductance because the electric passage is opened at the time of switching on/off the switching device of the cyclo converter circuit 4. For example, at time t1 shown in FIG. 12, a status in which the polarity of the voltage $V_2$ is positive, the switches $Q_5$ and $Q_8$ are switched on and the cyclo converter circuit 4 is transmitting the positive voltage Vcc and being shifted to a status in which the switch $Q_5$ is switched off, the switches $Q_6$ and $Q_8$ are switched on and the cyclo converter circuit 4 transmits zero voltage.

The switching device takes a long period of time to be actually switched on/off. Therefore, the switch $Q_6$ must be switched on after the switch $Q_5$ has been switched off in order to prevent an operational mode in which the switches $Q_5$ and $Q_6$ are simultaneously switched on and thereby the secondary terminal of the transformer 3 encounters a short circuit. However, since the circuit is temporarily opened during the shift from the switch $Q_5$ to the switch $Q_6$, the electric currents passing through the portions corresponding to the inductances of the filter circuit 5 and the load circuit 6 are cut off. Therefore, surge voltage is generated, causing a problem to arise in that excessively large voltage is applied to the switching device of the cyclo converter circuit 4 or the load circuit 6.

In order to overcome the above-described problem, an arrangement has been employed in which the switch $Q_n$ (n=5 to 8) of the cyclo converter circuit 4 is switched in only one direction as follows in accordance with the polarity of the output current from the cyclo converter circuit so as to perform the pulse width modulation in a manner similar to the above-described structure. For example, when the polarity of the output current from the cyclo converter circuit 4 is positive, the switching signals $T_5$, $T_6$, $T_7$ and $T_8$ are respectively applied to the switching devices $S_5$, $S_{6A}$, $S_{7A}$ and $S_8$ and the residual switching devices $S_{5A}$, $S_6$, $S_7$ and $S_{8A}$ are respectively switched off. When the polarity of the electric current is negative, the switching signals $T_5$, $T_6$, $T_7$ and $T_8$ are respectively applied to the switching devices $S_{5A}$, $S_6$, $S_7$ and $S_{8A}$ and as well as the residual switching devices $S_5$, $S_{6A}$, $S_{7A}$ and $S_8$ are respectively switched off.

However, the output current from the cyclo converter circuit 4 contains a ripple component generated due to the pulse width modulation. Therefore, its polarity changes to positive or negative when the quantity of the electric current is insufficient. As a result, the above-described switch selection cannot be performed satisfactorily, causing a necessity to arise in that an open state is created in the cyclo converter. As a result, surge voltage will undesirably be generated.

Accordingly, a great capacity snubber circuit must be included in the conventional power conversion apparatus for the purpose of absorbing the surge voltage. Moreover, the voltage rating of the switching device must be enlarged. Therefore, there arises a problem in that the size of the apparatus cannot be reduced or an excessively large loss is generated.

SUMMARY OF THE INVENTION

Accordingly, an object of the present invention is to provide an apparatus capable of overcoming the above-described problems, preventing the generation of surge voltage, reducing the overall size and reducing a loss.

In order to achieve the above objects, according to one aspect of the present invention, there is provided a power conversion apparatus comprising: an inverter circuit for converting DC power into AC power which has a first frequency; a transformer connected to the inverter circuit; a cyclo converter circuit having bidirectional switch means capable of controlling a direction in which an electric current passes and converting the output from the transformer into AC power which has a second frequency; and a switching signal generating circuit for generating a switching signal for controlling the polarity of the bidirectional switch means of the cyclo converter circuit in such a manner that the output voltage from the inverter circuit does not encounter a short circuit.

DESCRIPTION OF THE PREFERRED EMBODIMENTS

Preferred embodiments of the present invention will now be described with reference to the drawings.

Figure 1:
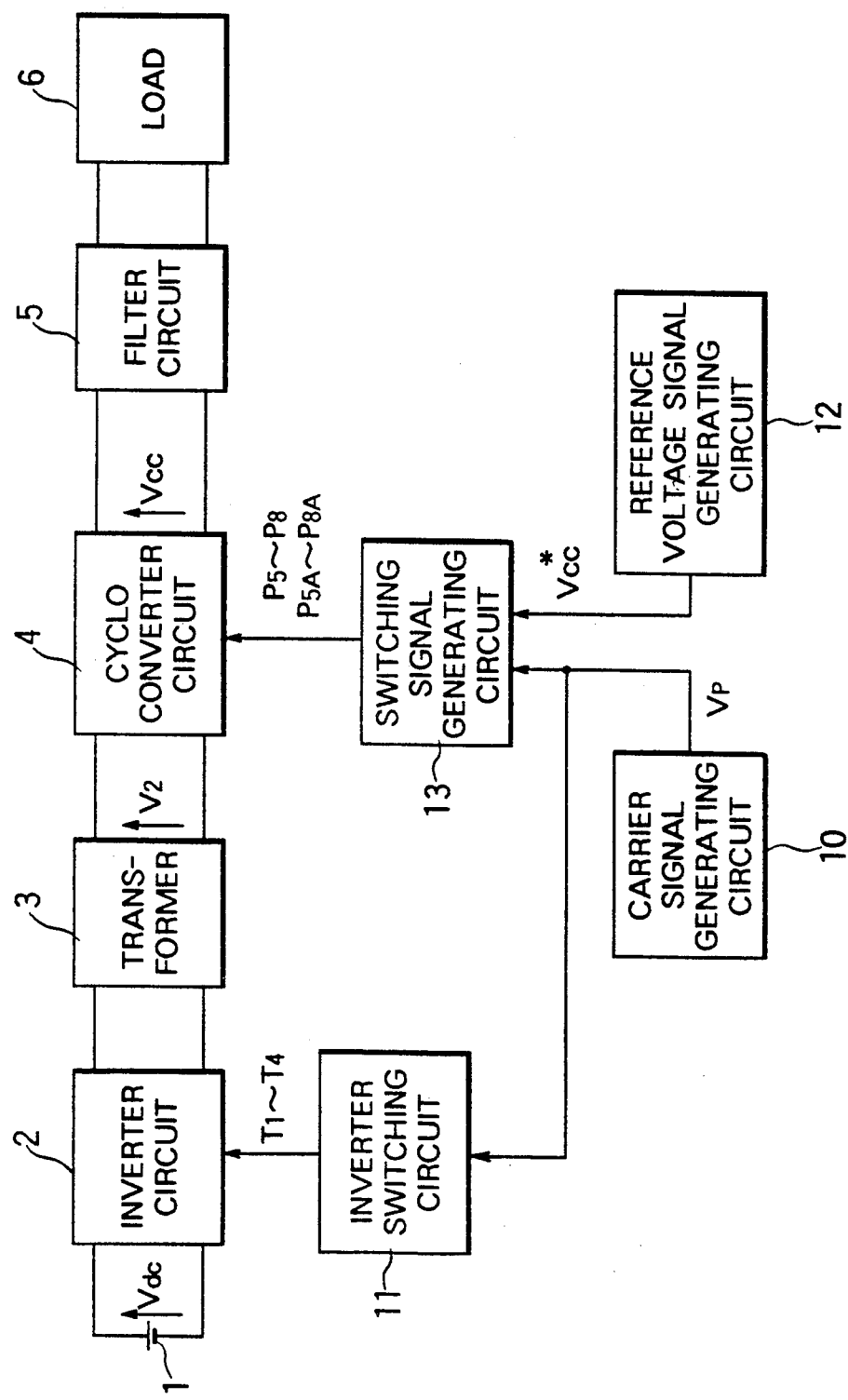
FIG. 1 is a block diagram which illustrates a first embodiment of a power conversion apparatus according to the present invention.
Figure 8:
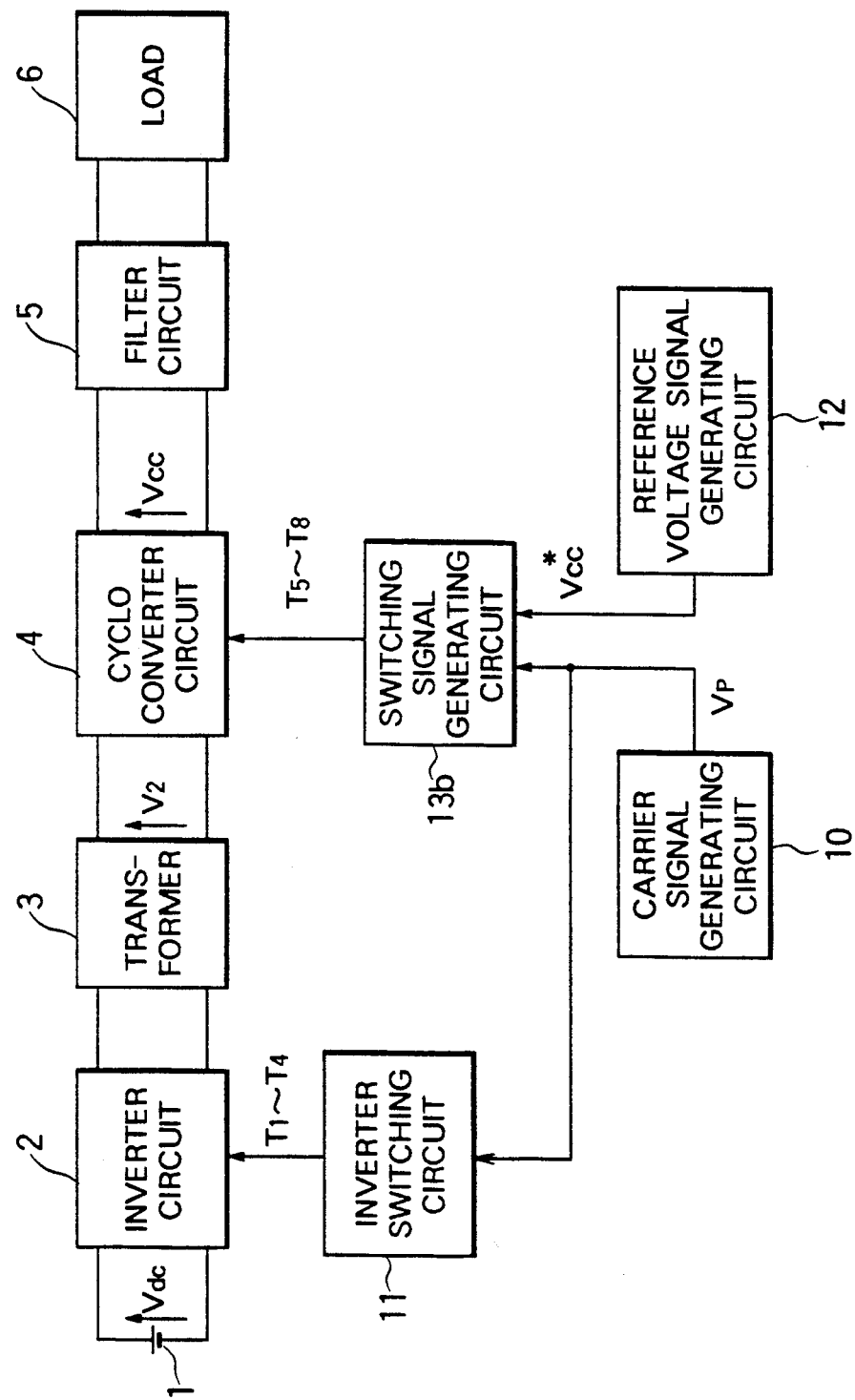
FIG. 8 is a block diagram which illustrates a conventional power conversion apparatus.
Figure 9:
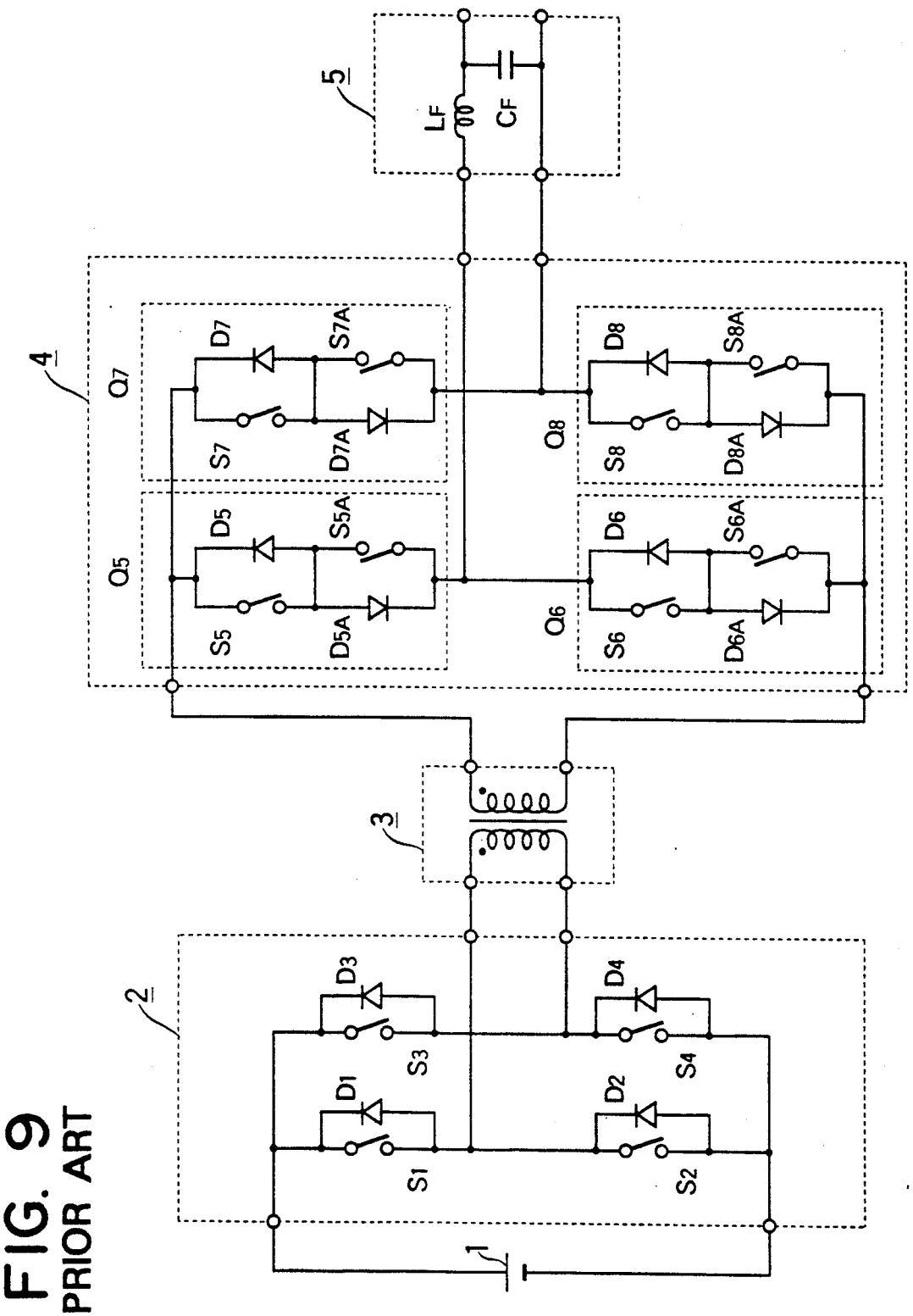
FIG. 9 illustrates the circuit diagram of an inverter circuit, a transformer, a cyclo converter circuit and a filter circuit according to the conventional structure.
Figure 10:
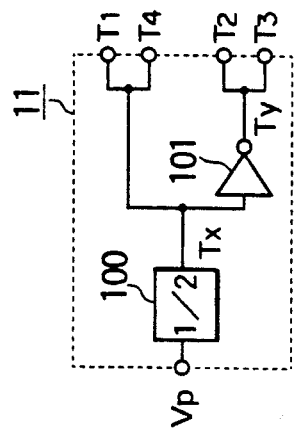
FIG. 10 is a block diagram which illustrates an inverter switching circuit according to the conventional structure.

As shown in FIG. 1, a power conversion apparatus according to a first embodiment of the present invention is arranged in such a manner that a switching signal generating circuit 13 is employed in place of the switching signal generating circuit 13b employed in the conventional power conversion apparatus shown in FIG. 8.

Figure 2:
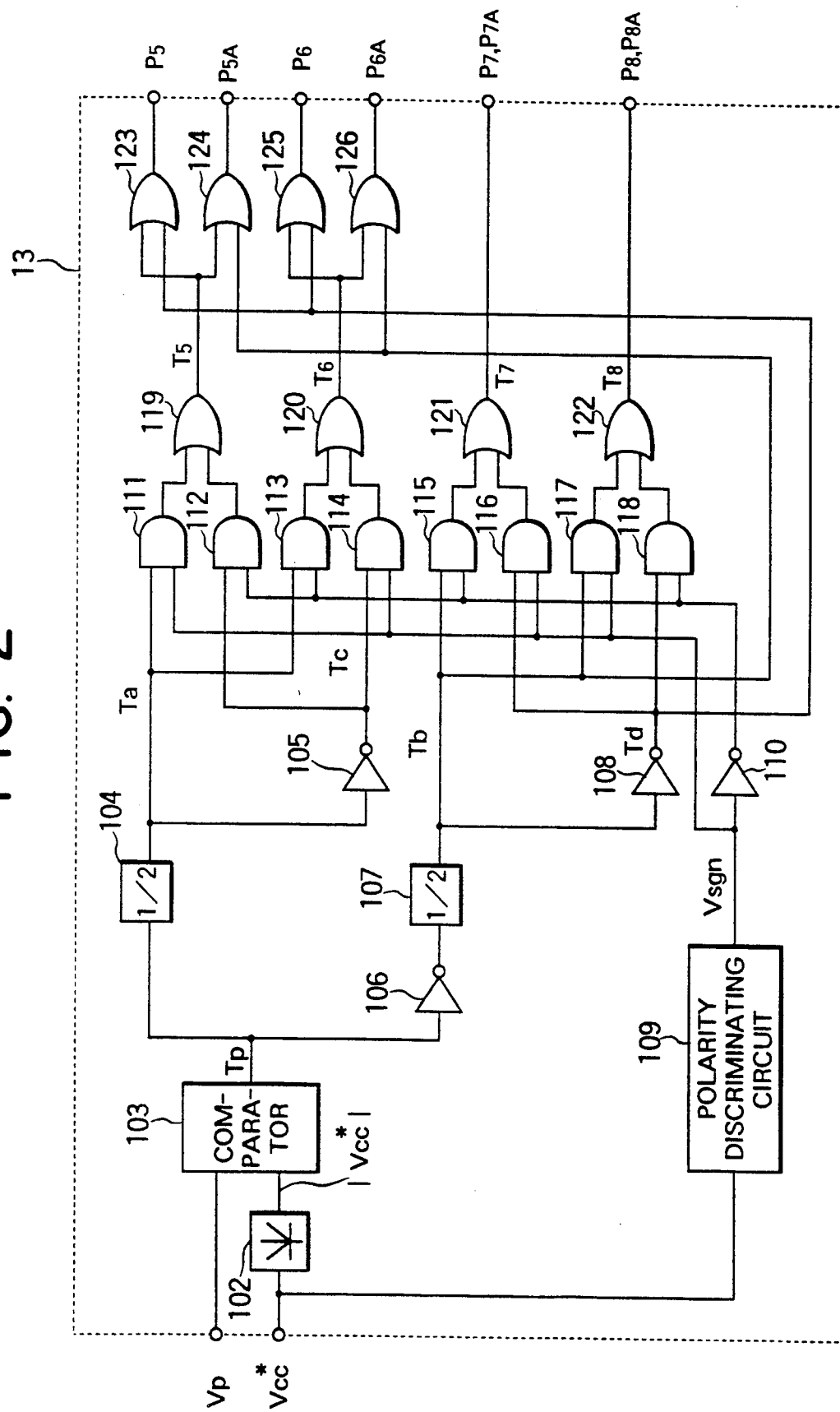
FIG. 2 is a block diagram which illustrates a switching signal generating circuit according to the first embodiment of the present invention.

As shown in FIG. 2, the switching signal generating circuit 13 comprises an absolute value circuit 102, a comparator 103, NOT circuits 105, 106, 108 and 110, ½ dividers 104 and 107, a polarity discriminating circuit 109, AND circuits 111 to 118 and OR circuits 119 to 126 so that switching signals $P_5$ to $P_8$ and $P_{5A}$ to $P_{8A}$ are transmitted. The above-described switching signals are respectively supplied to the corresponding switching devices $S_5$ to $S_8$ and $S_{5A}$ to $S_{8A}$ of the cyclo converter circuit 4.

Then, the operation of the first embodiment of the present invention thus-constituted will now be described with reference to a timing chart shown in FIG. 3. When the sawtooth shape carrier signal Vp facing an upper right direction is first transmitted from the carrier signal generating circuit 10, the signal Tx and Ty, the duty ratio of each of which is 50%, are supplied from the inverter switching circuit 11 to the inverter circuit 2 as the switching signals $T_1$ to $T_4$ similarly to the conventional structure shown in FIG. 8. As a result, the rectangular voltage $V_2$, the duty ratio of which is 50%, is transmitted from the transformer 3.

Figure 11:
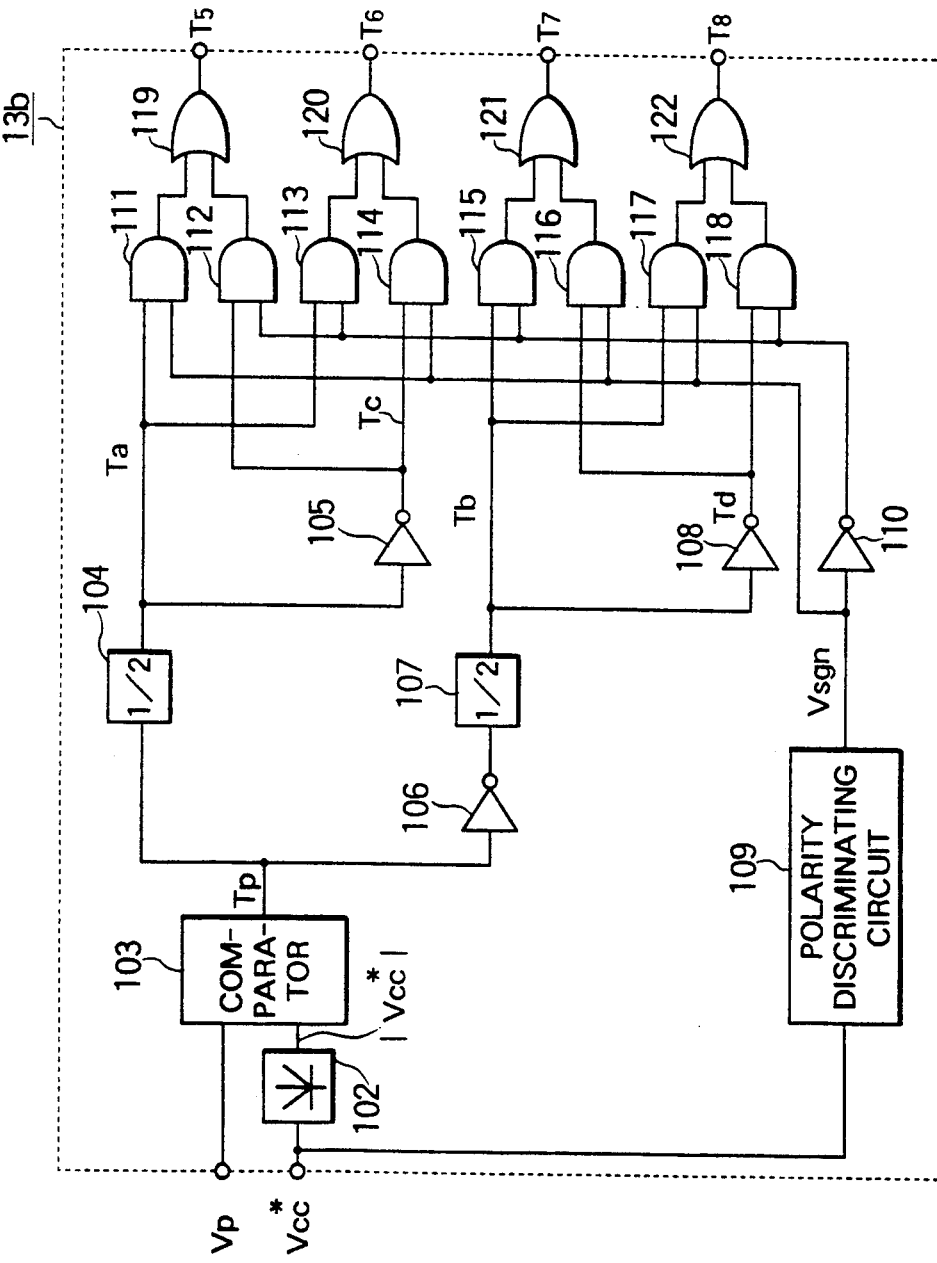
FIG. 11 is a block diagram which illustrates a switching signal generating circuit according to the conventional structure.
Figure 12:
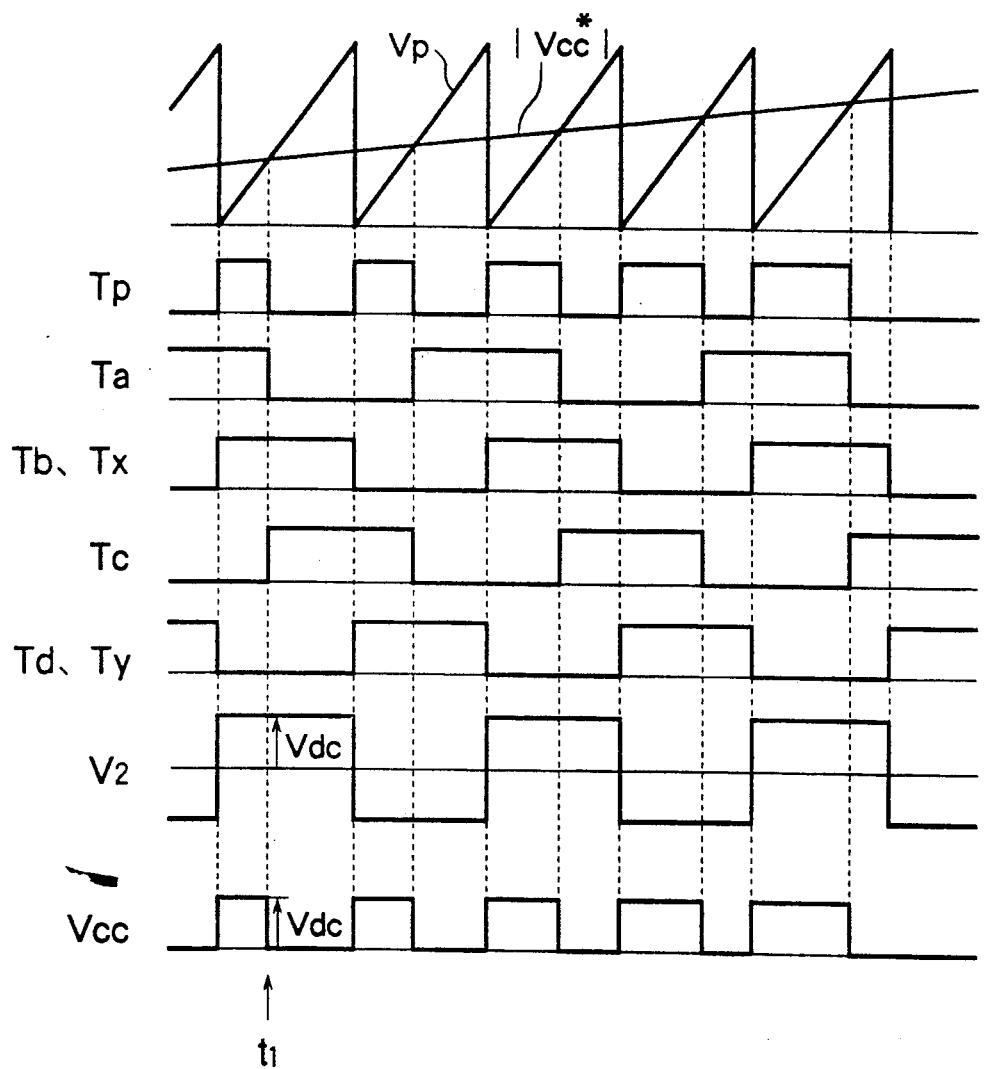
FIG. 12 is a timing chart which illustrates the operation of the conventional structure.

On the other hand, the reference voltage signal generating circuit 12 transmits the reference voltage signal $Vcc^*$ to be transmitted from the cyclo converter 4, the reference voltage signal $Vcc^*$ being, together with the carrier signal Vp, supplied to the switching signal generating circuit 13. The switching signal generating circuit 13 receives the above-described signals so as to transmit the switching signals $T_5$ to $T_8$ the pulse width of each which has been modulated as follows. Referring to FIG. 11, the reference voltage signal $Vcc^*$ is converted into the absolute signal $|Vcc^*|$ by the absolute value circuit 102. The absolute signal $|Vcc^*|$ is, together with the carrier signal Vp, supplied to the comparator 103. The comparator 103 transmits the signal Tp shown in FIG. 12, the signal Tp being then supplied to the ½ divider 104 in which the signal Tp is converted into the signal Ta. On the other hand, when the signal Tp is supplied to the ½ divider 107 after the sign of it has been inverted by the NOT circuit 106, the signal Tb formed into the same wave shape as that of the signal Tx is transmitted. Furthermore, when the signal Ta is supplied to the NOT circuit 105, the signal Tc is transmitted, while when the signal Tb is supplied to the NOT circuit 108, the signal Td formed into the same wave shape as that of the signal Ty is transmitted.

Furthermore, the polarity discriminating circuit 109 transmits the polarity signal Vsgn denoting the polarity of the reference voltage signal Vcc. In addition, the NOT circuit 110 transmits a signal which is a signal obtainable by inverting the sign of the polarity signal Vsgn. The above-described signals and the signals Ta to Td are, via the AND circuits 111 to 118, supplied to the OR circuits 119 to 122. In accordance with the polarity of the reference voltage signal Vcc, the signals $T_5$ to $T_8$ expressed by the above-described Equation B or D are respectively transmitted from the OR circuits 119 to 122.

Figure 3:
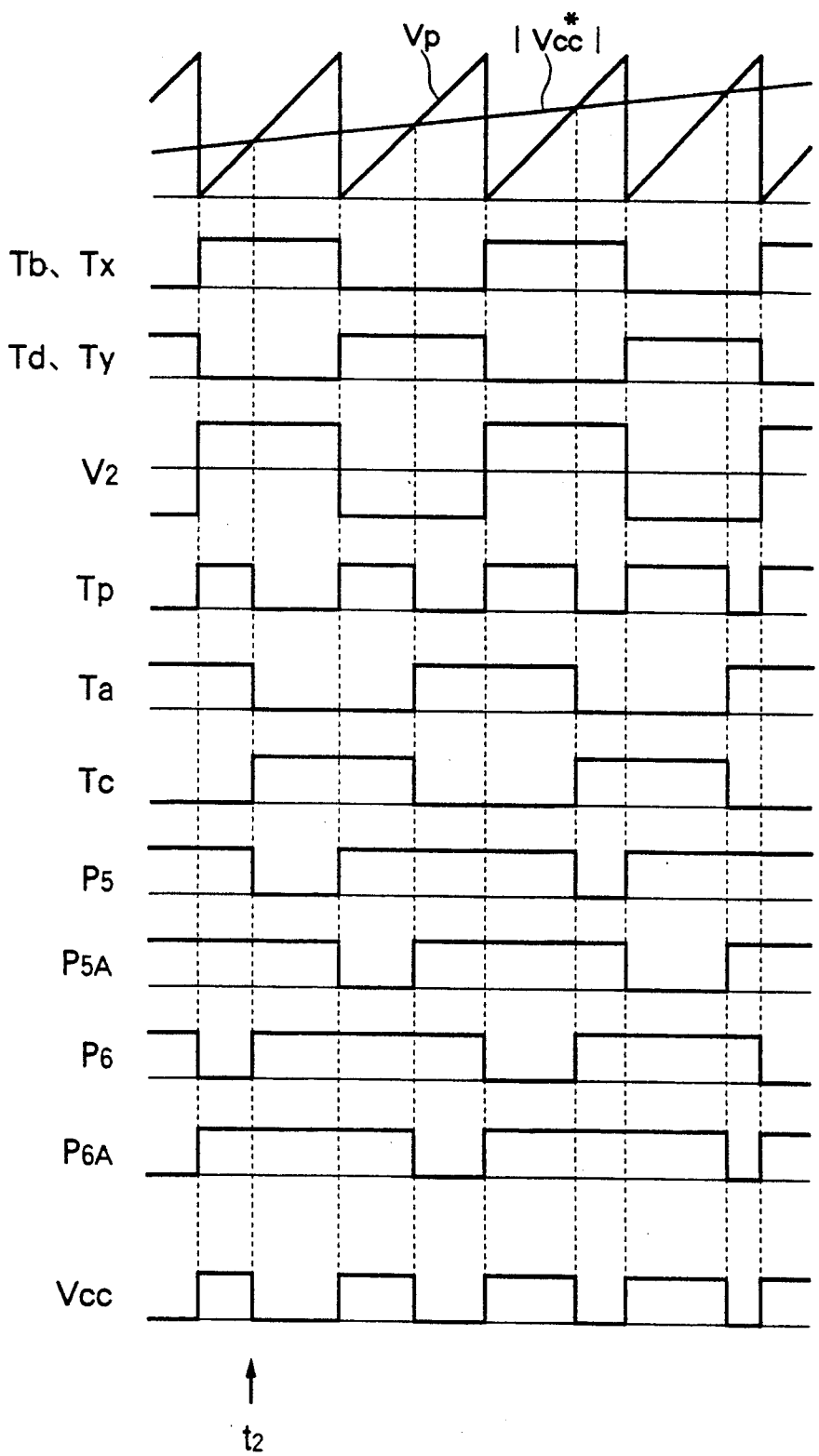
FIG. 3 is a timing chart which illustrates the operation of the first embodiment of the present invention.

As a result, the logical sum of the signals $T_5$ and Td is calculated in the OR circuit 123 so that the switching signal $P_5$ shown in FIG. 3 is generated so as to be supplied to the switching device $S_5$ of the cyclo converter circuit 4. Similarly, the logical sum of the signals $T_5$ and Tb, that of the signals $T_6$ and Td and that of the signals $T_6$ and Tb are calculated in the OR circuits 124 to 126 so that the switching signal $P_{5A}$, $P_6$ and $P_{6A}$ are generated so as to be supplied to the switching devices $S_{5A}$, $S_6$ and $S_{6A}$.

The signal $T_7$ is as it is supplied to the switching devices $S_7$ and $S_{7A}$ as the switching signals $P_7$ and $P_{7A}$. Furthermore, the signal $T_8$ is as it is supplied to the switching devices $S_8$ and $S_{8A}$ as the switching signals $P_8$ and $P_{8A}$.

Then, the operation performed at time t2 shown in FIG. 3 will now be described. At this time, the status in which the polarity of the voltage $V_2$ has been positive, the switches $Q_5$ and $Q_8$ have been switched on and the cyclo converter circuit 4 has been transmitting positive voltage is being changed to a status in which the switch $Q_5$ is switched off, the switches $Q_6$ and $Q_8$ are switched on and the cyclo converter circuit 4 transmits zero voltage. An assumption is made here that the electric current passes in a positive direction through a route composed of the switching device $S_5$, the diode $D_{5A}$, the filter circuit 5, the load circuit 6, the switching device $S_8$ and the diode $D_{8A}$ in this sequential order When the switching device $S_5$ is switched off in this state, passing of the electric current is continued due to the portion of the inductance of each of the filter circuit 5 and the load circuit 6. However, since the switching-on signal has been supplied to the switching device $S_{6A}$ at this time, the above-described current is shifted to the switches $S_{6A}$-$D_6$ so as to be circulated. Therefore, the electric current passing through the portion corresponding to the inductance is not cut off. Furthermore, no surge voltage is generated. Therefore, the necessity of using the great capacity snubber circuit for absorbing the surge voltage can be eliminated.

Then, a second embodiment of the present invention will now be described with reference to FIGS. 4 to 7.

Figure 4:
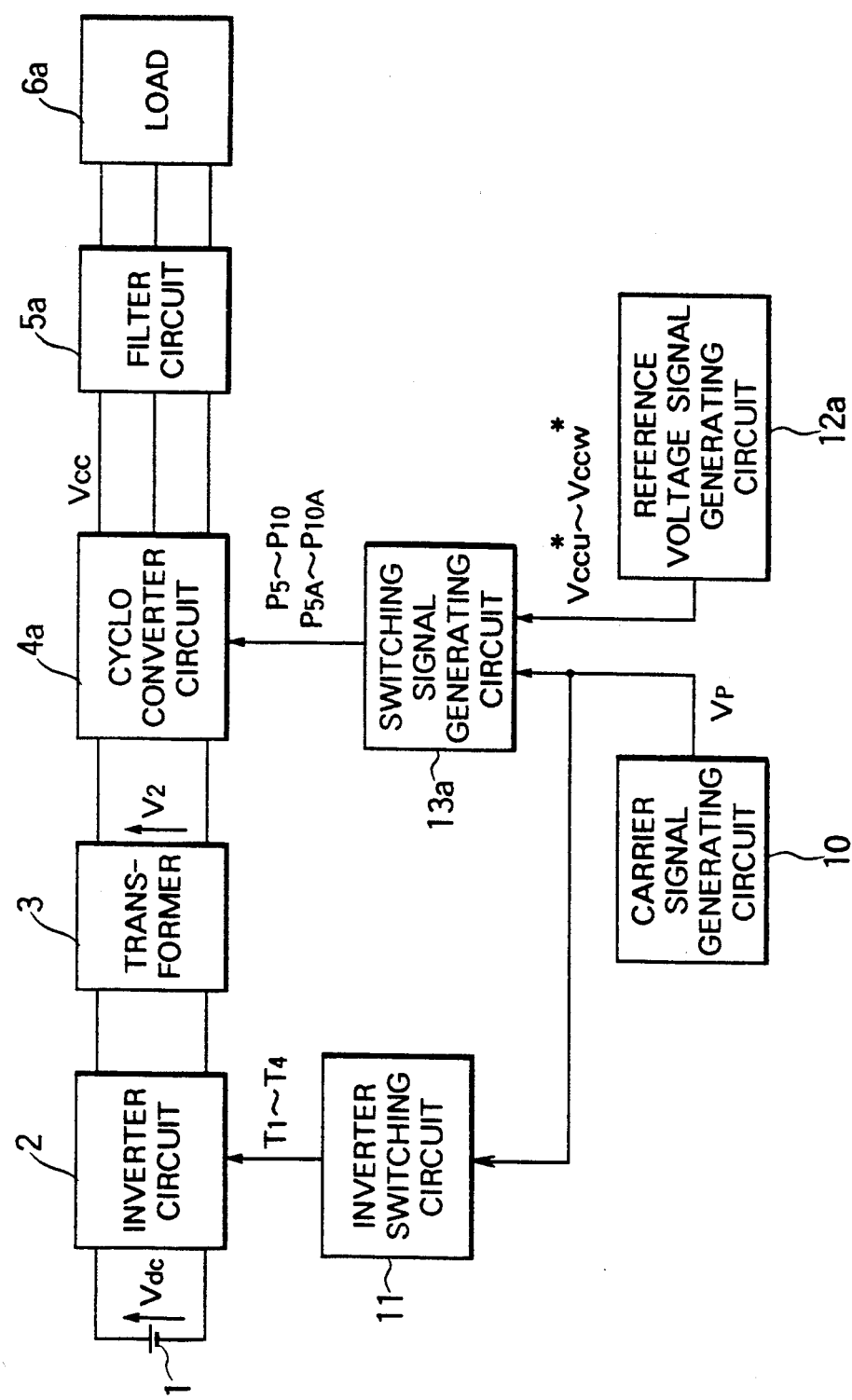
FIG. 4 is a block diagram which illustrates a second embodiment of the power conversion apparatus according to the present invention.

FIG. 4 is a structural view which illustrates a second embodiment of the present invention. Referring to FIG. 4, reference numeral 4a represents a three-phase cyclo converter circuit and 5a represents a three-phase filter circuit connected to the output terminal of the three-phase cyclo converter circuit 4a. Reference numeral 6a represents a three-phase load circuit connected to the output terminal of the three-phase filter circuit 5a. Reference numeral 12a represents a three-phase reference voltage signal generating circuit for generating a signal denoting the reference voltage which serves as a reference of the output voltage from the cyclo converter circuit 4a. Reference numeral 13a represents a switching signal generating circuit of the cyclo converter.

Figure 5:
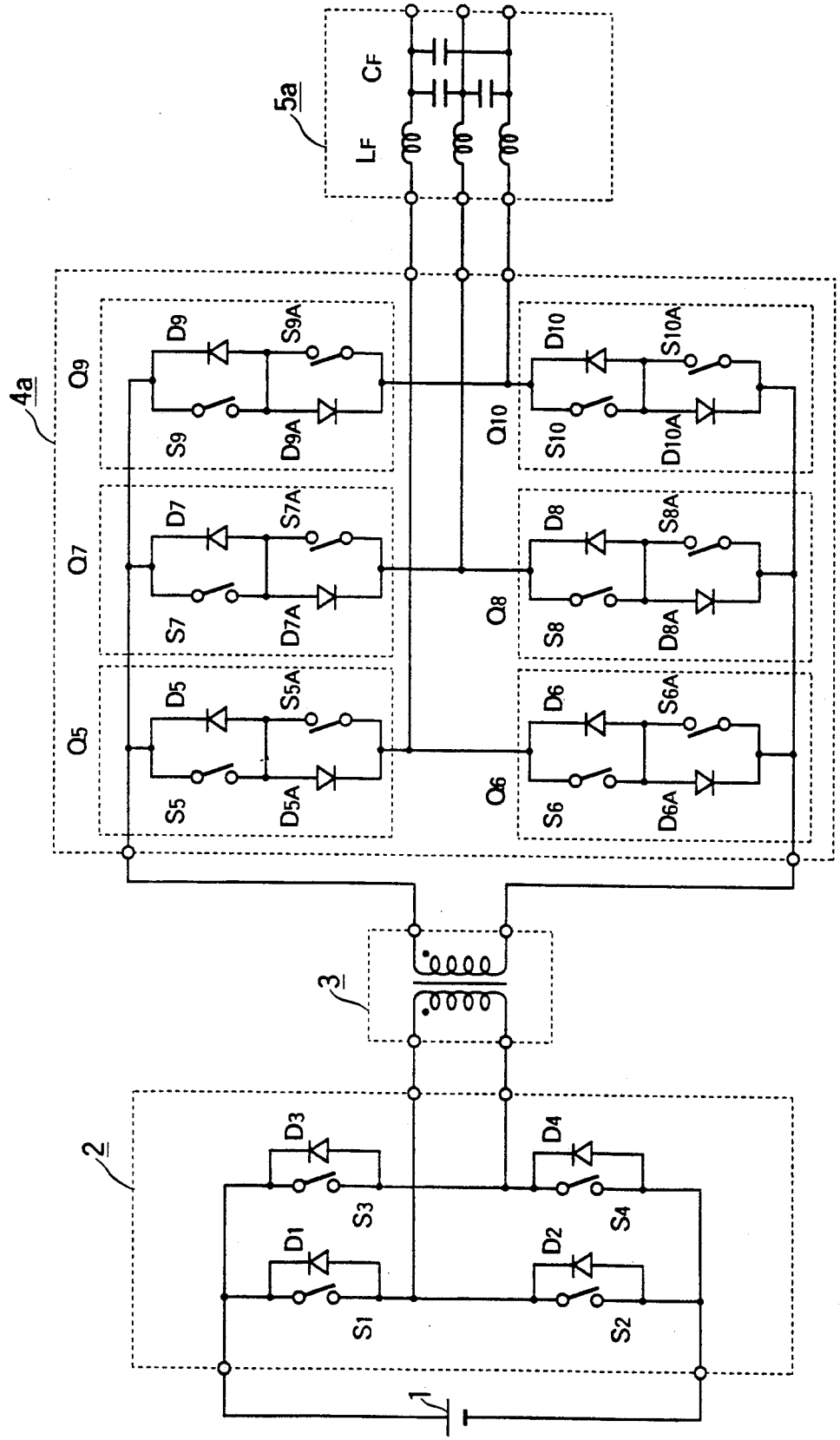
FIG. 5 illustrates the circuit diagram of an inverter circuit, a transformer, a cyclo converter circuit and a filter circuit according to the second embodiment of the present invention.

FIG. 5 is a structural view which illustrates the detailed structures of the cyclo converter circuit 4a and the filter circuit 5a. The cyclo converter circuit 4a comprises switching devices $S_5$ to $S_{10}$ and $S_{5A}$ to $S_{10A}$, diodes $D_5$ to $D_{10}$ and $D_{5A}$ to $D_{10A}$ connected to the above-described switching devices $S_5$ to $S_{10}$ and $S_{5A}$ to $S_{10A}$ in an anti-parallel manner. The filter circuit 5a is composed of three reactors $L_F$ and three capacitors $C_F$.

Figure 6:
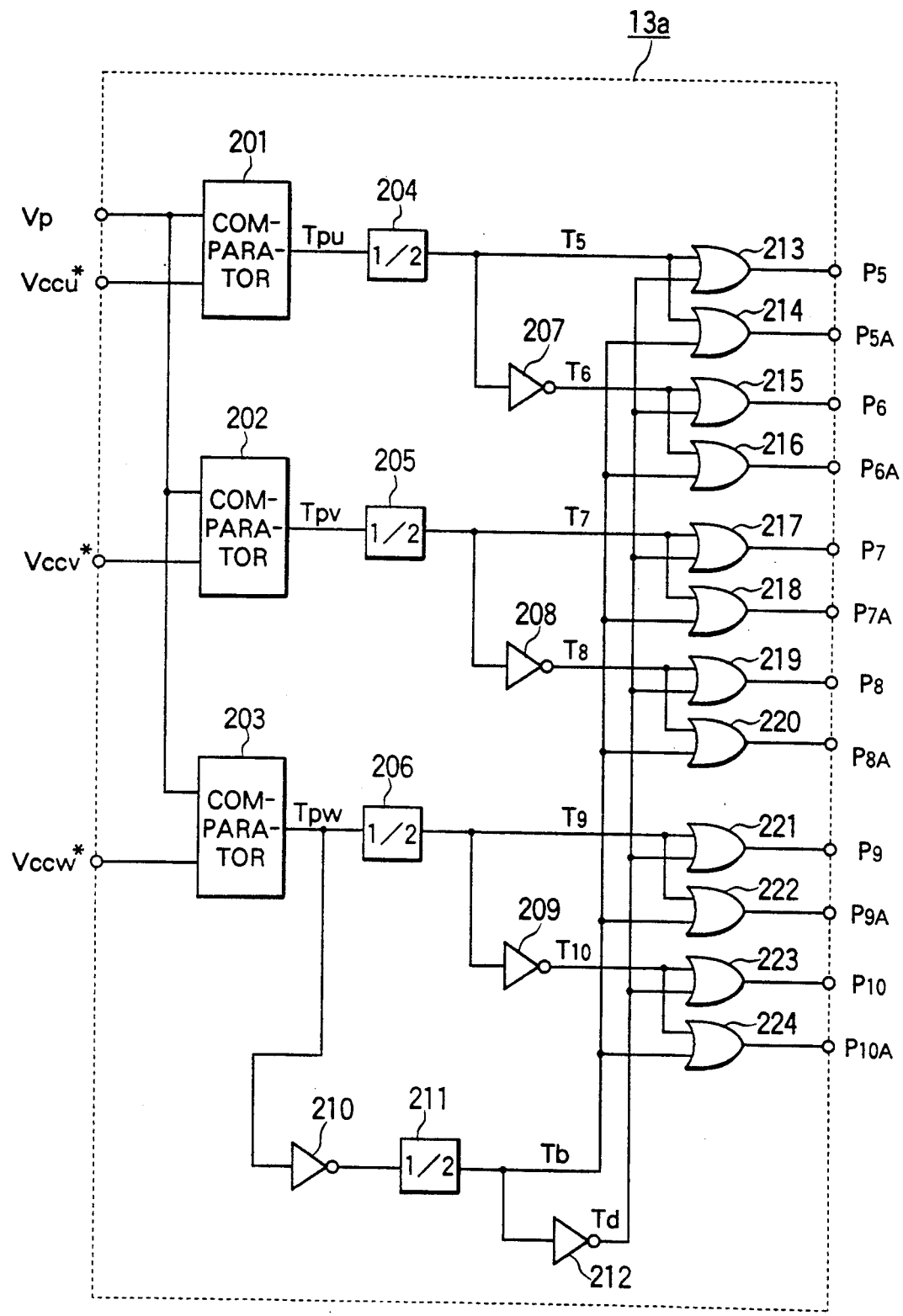
FIG. 6 is a block diagram which illustrates a switching signal generating circuit according to the second embodiment of the present invention.

FIG. 6 is a block diagram which illustrates the detailed structure of the switching signal generating circuit 13a. Referring to FIG. 6, reference numerals 201 to 203 represent comparators and 204 to 206 and 211 represent ½ dividers which transmit output signals the polarity of each of which is inverted in synchronization with the last transition of the input signal. Reference numerals 207 to 210 and 212 represent NOT circuits and 213 to 224 represent OR circuits.

Then, the operation of the second embodiment will now be described with reference to a timing chart shown in FIG. 7.

Similarly to the first embodiment, the rectangular voltage $V_2$, the duty ratio of which is 50% and which synchronizes with the carrier signal Vp, is transmitted from the transformer 3. On the other hand, in the switching signal generating circuit 13a, the carrier signal Vp and three-phase reference voltage signals Vccu*, Vccv* and Vccw* transmitted from the reference voltage signal generating circuit 12a are subjected to comparisons by the comparators 201 to 203 so that signals Tpu to Tpw are formed. The u-phase ½ divider 204 converts the signal Tpu into the signal $T_5$ before the polarity of it is inverted by the NOT circuit 207 so that the signal $T_6$ shown in FIG. 7 is obtained. In the ½ divider 211 to which the w-phase signal Tpw has been supplied after its polarity had been inverted by the NOT circuit 210, the signal Tb which synchronizes with the carrier signal Vp is obtained. The polarity of the signal Tb is then inverted by the NOT circuit 212 so that the signal Td is obtained.

Figure 7:
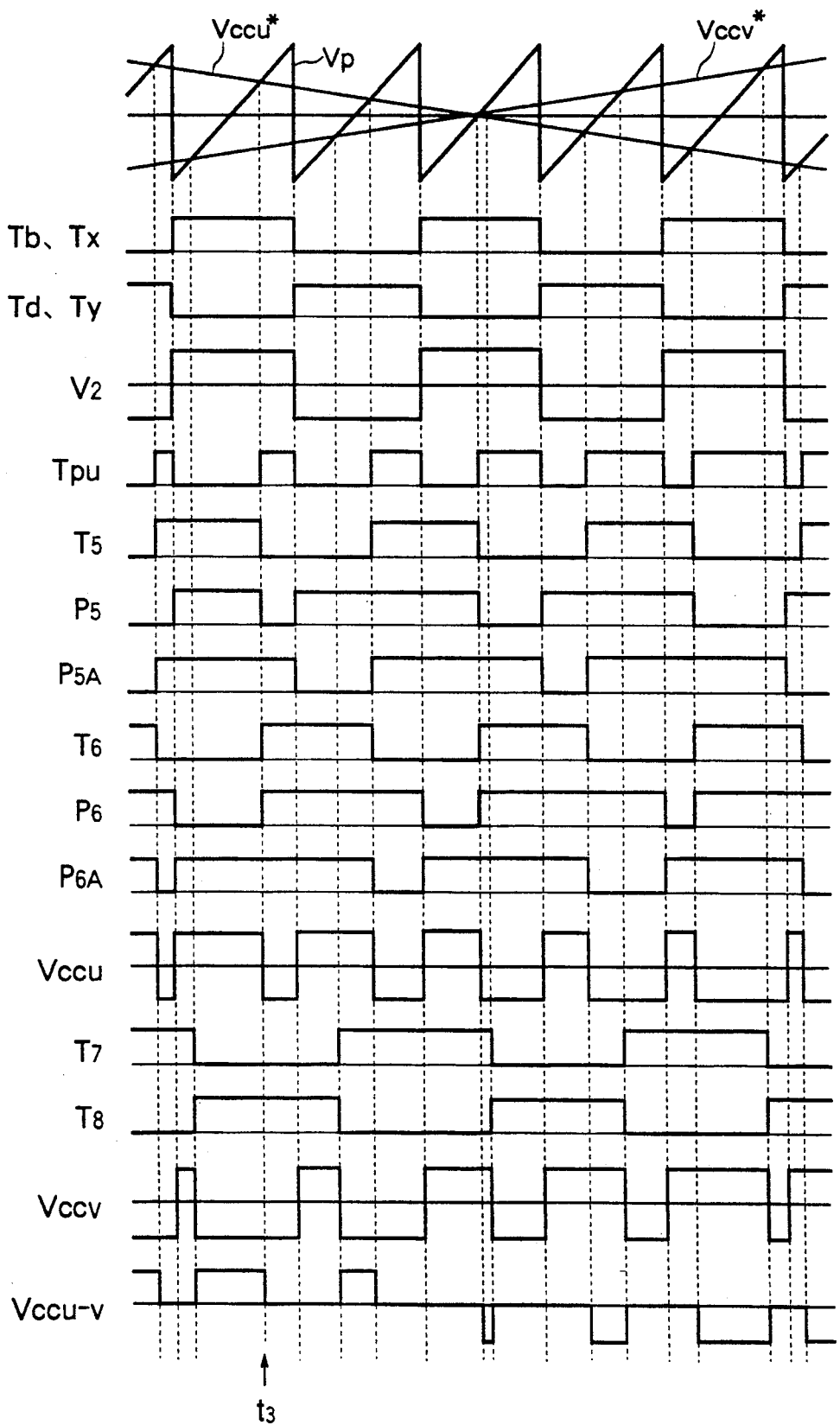
FIG. 7 is a timing chart which illustrates the operation of the second embodiment of the present invention.

As a result, the logical sum of the signals $T_5$ and Td is calculated in the OR circuit 213 so that the switching signal $P_5$ shown in FIG. 7 is generated so as to be supplied to the switching device $S_5$ of the cyclo converter circuit 4a. Similarly, the logical sum of the signals $T_5$ and Tb, that of the signals $T_6$ and Td and that of the signals $T_6$ and Tb are calculated in the OR circuits 214 to 216 so that the switching signals $P_{5A}$, $P_6$, and $P_{6A}$ are generated so as to be supplied to the switching devices $S_{5A}$, $S_6$ and $S_{6A}$.

Similarly to the u-phase, the switching signals $P_7$, $P_{7A}$, $P_8$ and $P_{8A}$ are supplied to the v-phase switching devices $S_7$, $S_{7A}$, $S_8$ and $S_{8A}$ from the OR circuits 217 to 220. Switching signals $P_9$, $P_{9A}$, $P_{10}$ and $P_{10A}$ are supplied to w-phase switching devices $S_9$, $S_{9A}$, $S_{10}$ and $S_{10A}$ from the OR circuits 221 to 224.

Then, the operation to be performed at time t3 shown in FIG. 7 will now be described. At this time, a status in which the polarity of the voltage $V_2$ is positive, the switch $Q_5$ has been switched on so that positive voltage Vccu is transmitted on the basis of an imaginary neutral point, for example, the middle point of the secondary coil of the transformer 3 is being shifted to a status in which the switch $Q_5$ is switched off and as well as the switch $Q_6$ is switched on so that negative voltage Vccu is transmitted. An assumption is made here that the electric current passes in a positive direction from the switching device $S_5$-diode $D_{5A}$ to the filter circuit 5a at this time. When the switch $Q_5$ is switched off in this state, the electric current which has passed through the switching device $S_5$ is shifted to the switch $S_{6A}$--$D_6$ to which the switching-on signal has been supplied at this time.

Therefore, the electric current passing through the portion corresponding to the inductance of the filter circuit 5a and the load circuit 6a is not cut off. Furthermore, no surge voltage is generated. Therefore, the necessity of using the great capacity snubber circuit for absorbing the surge voltage can be eliminated. Also at the other timing and in the other phases, the mode in which the passage for the electric current is opened can be eliminated so that similar effects can be obtained.

According to the above-described embodiments, the switch for the cyclo converter is constituted by the switching devices and the dioded. However, the present invention is not limited to this. Therefore, any switch which is capable of controlling the direction of the electric current may be employed to obtain the effect obtainable from the above-described embodiments.

What is claimed is:

1. A power conversion apparatus comprising:
   an inverter circuit for converting DC power into AC power which has a first frequency;
   a transformer connected to said inverter circuit;
   a cyclo converter circuit having bidirectional switch means for controlling a direction in which an electric current passes and converting an output from said transformer into AC power which has a second frequency; and a switching signal generating circuit for generating first, second, third and fourth intermediate switching signals; and means for converting the first and second intermediate switching signals into a plurality of final switching signals, the third and fourth intermediate switching signals and the plurality of final switching signals controlling the polarity of said bidirectional switch means of said cyclo converter circuit in such a manner that the output voltage from said inverter circuit does not encounter a short circuit.

2. An apparatus according to claim 1 further comprising:

a carrier signal generating circuit for generating a carrier signal having a predetermined frequency;

an inverter switching circuit for generating a signal for controlling said inverter circuit in synchronization with said carrier signal; and a reference voltage signal generating circuit for generating a reference signal for AC voltage to be transmitted from said cyclo converter circuit, said switching signal generating circuit generating a switching signal in response to the carrier signal transmitted from said carrier signal generating circuit and the reference voltage signal transmitted from said reference voltage signal generating circuit.

3. An apparatus according to claim 1 wherein said bidirectional switch means of said cyclo converter circuit comprises a plurality of bidirectional switches each having a pair of switches each of which is arranged to pass an electric current in opposing directions, said switching signal generating circuit generating a switching signal for always switching on either of said pair of bidirectional switches which has a polarity which does not cause the output voltage from said inverter circuit to encounter a short circuit.

4. An apparatus according to claim 3 wherein said switching signal generating circuit transmits a switching signal which corresponds to each switch of said bidirectional switch means of said cyclo converter circuit, the pulse width of which has been modulated.

5. An apparatus according to claim 1 further comprising a filter circuit for removing a high frequency component contained in the output from said cyclo converter circuit.

6. An apparatus according to claim 1 wherein said inverter circuit transmits AC power the duty ratio of which is 50%.

7. A power conversion apparatus comprising:

an inverter circuit for converting DC power into AC power which has a first frequency;

a transformer connected to said inverter circuit;

a cyclo converter circuit having first and second bidirectional switches, the first bidirectional switch being connected to a first terminal of the transformer and the second bidirectional switch being connected to a second terminal of the transformer, said cyclo converter circuit converting an output from said transformer into AC power which has a second frequency; and a switching signal generating circuit which generates first and second switching signals that control the first bidirectional switch and third and fourth switching signals which control the second bidirectional switch such that the second bidirectional switch is closed before the first bidirectional switch is opened thus minimizing voltage surge at the cyclo converter circuit.

* * * * *